(12) United States Patent
Itagaki et al.

(10) Patent No.: US 9,624,976 B2
(45) Date of Patent: Apr. 18, 2017

(54) METHOD OF MANUFACTURING CORRUGATED CAGE AND CORRUGATED CAGE

(71) Applicant: NSK LTD., Tokyo (JP)

(72) Inventors: Keita Itagaki, Fujisawa (JP); Soutarou Gunjima, Fujisawa (JP)

(73) Assignee: NSK LTD., Shinagawa-ku, Tokyo (JP)

( * ) Notice: Subject to any disclaimer, the term of this patent is extended or adjusted under 35 U.S.C. 154(b) by 0 days.

(21) Appl. No.: 14/392,269

(22) PCT Filed: Jun. 9, 2014

(86) PCT No.: PCT/JP2014/065271
§ 371 (c)(1),
(2) Date: Dec. 24, 2015

(87) PCT Pub. No.: WO2014/208325
PCT Pub. Date: Dec. 31, 2014

(65) Prior Publication Data
US 2016/0298684 A1    Oct. 13, 2016

(30) Foreign Application Priority Data

Jun. 27, 2013  (JP) .................. 2013-134424
Oct. 1, 2013   (JP) .................. 2013-206215
Dec. 27, 2013  (JP) .................. 2013-271393

(51) Int. Cl.
*F16C 33/42*    (2006.01)
*F16C 19/06*    (2006.01)
*F16C 33/44*    (2006.01)

(52) U.S. Cl.
CPC ............ *F16C 33/427* (2013.01); *F16C 19/06* (2013.01); *F16C 33/445* (2013.01); *F16C 2223/14* (2013.01); *F16C 2226/54* (2013.01)

(58) Field of Classification Search
CPC ..... F16C 33/3868; F16C 33/427; F16C 19/06
See application file for complete search history.

(56) References Cited

U.S. PATENT DOCUMENTS 3,471,208 A * 10/1969 Vannest ............. F16C 33/3868
                                                384/530
5,833,373 A * 11/1998 Ueno .................... F16C 33/427
                                                384/527
6,010,248 A *  1/2000 Ueno ...................... F16C 33/30
                                                384/492

FOREIGN PATENT DOCUMENTS

EP       0802339 B1    6/2009
JP       48-019838 U   3/1973
(Continued)

OTHER PUBLICATIONS

Search Report issued on Aug. 26, 2014 by the International Searching Authority in related Application No. PCT/JP2014/065271, (PCT/ISA/210).

(Continued)

*Primary Examiner* — Thomas R. Hannon
(74) *Attorney, Agent, or Firm* — Sughrue Mion, PLLC

(57) ABSTRACT

In a manufacturing process of a corrugated cage, an intermediate assembly 17a is configured by press-fitting each of press-fitting portions 24 and 24 respectively provided in base end portions of rod portions 13b and 13b of rivets 9b and 9b into each of through-holes 12a and 12a of a cage element 8a on one side, and nitriding treatment is performed on the intermediate assembly 17a. An axial dimension X of each of the press-fitting portions 24 and 24 is made smaller than an axial dimension Y of each of the through-holes 12a and 12a (X<Y). In this way, portions which do not come into close contact with each other are provided in axial portions of the inner peripheral surface of each of the through-holes 12a and 12a and the outer peripheral surface of each of the (Continued)

rod portions 13b and 13b, and thus a nitrided layer is formed on each of these portions which do not come into close contact with each other.

2 Claims, 11 Drawing Sheets

(56) References Cited

FOREIGN PATENT DOCUMENTS

| JP | 49-058939 U | 5/1974 |
|---|---|---|
| JP | 51-038132 U | 3/1976 |
| JP | S51-17381 Y2 | 5/1976 |
| JP | S53-43957 Y2 | 10/1978 |
| JP | 57-80725 U | 5/1982 |
| JP | 57-104015 U | 6/1982 |
| JP | 5-47545 U | 6/1993 |
| JP | 10-281163 A | 10/1998 |
| JP | 2009-8164 A | 1/2009 |
| JP | 4967855 B2 | 7/2012 |

OTHER PUBLICATIONS

Written Opinion issued on Aug. 26, 2015 by the International Searching Authority in related Application No. PCT/JP2014/065271, (PCT/ISA/237).

Search Report dated May 17, 2016, issued by the European Patent Office in counterpart European Application No. 14817494.9.

Communication dated Jan. 3, 2017, issued by the State Intellectual Property Office of P.R. China in counterpart Chinese Application No. 201480036302.2.

* cited by examiner

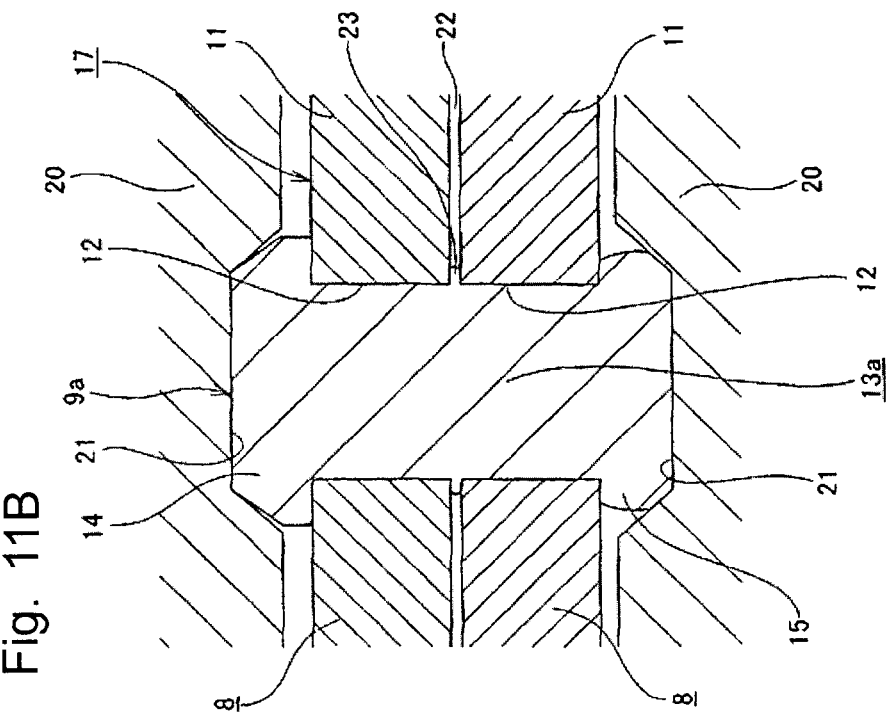
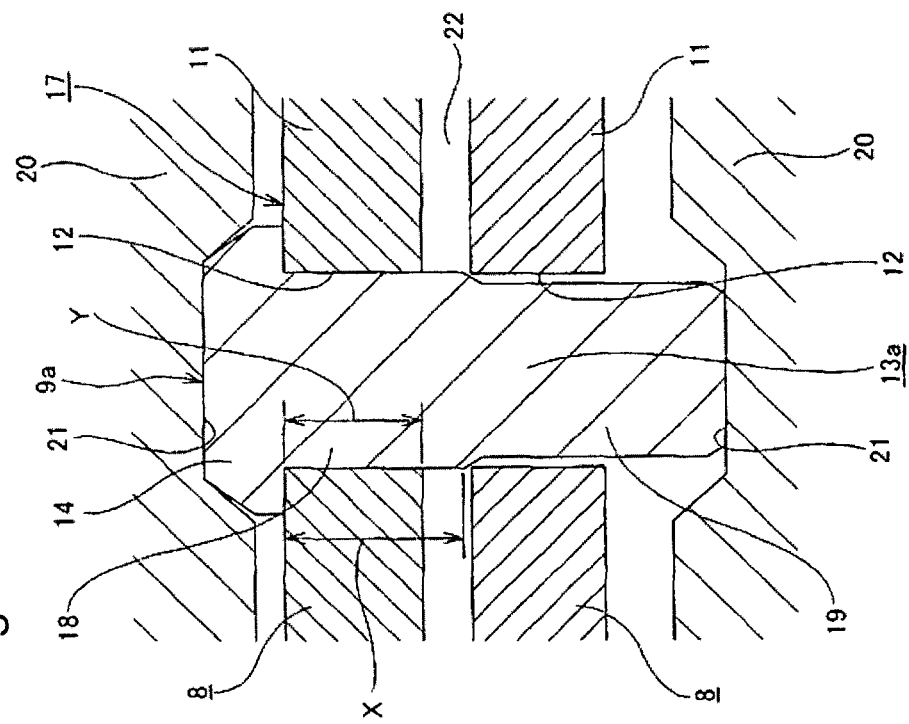

METHOD OF MANUFACTURING CORRUGATED CAGE AND CORRUGATED CAGE

TECHNICAL FIELD

The present invention relates to the improvement of a corrugated cage which holds balls, which configure various rolling bearings which are incorporated into rotary support portions of various machinery and equipment such as automobiles, general industrial machinery, or machine tools, such as a radial ball bearing, and the improvement of a method of manufacturing the corrugated cage.

BACKGROUND ART

As a rolling bearing which is incorporated into a rotary support portion of various machinery and equipment, for example, a single-row deep groove type ball bearing 1 as shown in FIG. 7 is widely used. The ball bearing 1 is provided with an inner ring 3 having an inner ring raceway 2 on the outer peripheral surface thereof, an outer ring 5 having an outer ring raceway 4 on the inner peripheral surface thereof, a plurality of balls 6 rollably provided between the inner ring raceway 2 and the outer ring raceway 4, and a cage 7 which rollably holds the respective balls 6.

The cage 7 is called a corrugated cage and is made by joining a pair of cage elements 8 and 8 to each other by a plurality of rivets 9 and 9, as shown in FIGS. 8 and 9. Each of the pair of cage elements 8 and 8 is made in the form of a corrugated ring as a whole by performing punching and bending by a press on a material made of a metal plate such as a steel sheet or a stainless steel sheet. The pair of cage elements 8 and 8 respectively has substantially partial spherical shell-shaped (substantially partial spherical) curved plate portions 10 and 10 provided at a plurality of locations in a circumferential direction, flat plate portions 11 and 11 each provided between the curved plate portions 10 and 10 adjacent to each other in the circumferential direction, and through-holes 12 and 12 each provided in the central portion of each of the flat plate portions 11 and 11. Further, each of the rivets 9 and 9 is made of metal such as steel or stainless steel and has a rod portion 13 and a head portion 14 provided at a base end portion of the rod portion 13.

In the cage 7, a caulking portion 15 is formed by crushing a tip portion of each rod portion 13 in a state where the respective flat plate portions 11 and 11 of the pair of cage elements 8 and 8 are superimposed on each other and the rod portion 13 of each of the rivets 9 and 9 is inserted into the through-holes 12 and 12 formed at mutually matching positions of the respective flat plate portions 11 and 11. Then, the respective flat plate portions 11 and 11 superimposed on each other are joined to each other by being pinched by the head portion 14 and the caulking portion 15 of each of the rivets 9 and 9. Then, in this state, portions surrounded by the respective curved plate portions 10 and 10 serve as pockets 16 and 16 for rollably holding the respective balls 6.

There is a case where the ball bearing 1 provided with the cage 7 as described above is incorporated into a rotary support portion or the like of the other end portion of a rotary shaft connected, at one end portion, to a movable scroll configuring a scroll type compressor for refrigerant compression, for example, and used in a situation where the inner ring 3 and the outer ring 5 are eccentric or are inclined. In such a case, in operation, there is a possibility that a significant force may act on the cage 7 from each ball 6 due to a difference or the like in revolution speed between the respective balls 6, and therefore, it is necessary to sufficiently secure the durability of the cage 7. Specifically, it is necessary to sufficiently secure the strength of the pair of cage elements 8 and 8 and the respective rivets 9 and 9 configuring the cage 7. As a method of improving the strength of each of these members 8 and 9, there is a method of increasing the wall thicknesses of the pair of cage elements 8 and 8 or the diameters of the respective rivets 9 and 9. However, due to dimensional constraint, the method cannot be often adopted. In contrast, as a method in which the same object can be achieved almost without involving a change in dimension of each of the members 8 and 9, a method of forming a nitrided layer (a surface-hardened layer by nitriding treatment) on the surface of each of the members 8 and 9 has been known in the past.

In a case of adopting such a method, for example, in a case where nitriding treatment is performed on the pair of cage elements 8 and 8 and the respective rivets 9 and 9 in a state where each of the members is a single body, the nitriding treatment for the respective rivets 9 and 9 becomes troublesome and manufacturing costs increase. That is, each of the rivets 9 and 9 is a small part, and therefore, it is conceivable that the nitriding treatment for the respective rivets 9 and 9 is performed in a state where the respective rivets 9 and 9 are put together in a basket or the like. However, if the nitriding treatment is performed in such a state, it becomes difficult for the nitriding treatment to be performed on a portion where the respective rivets 9 and 9 are in contact with each other. As a result, it becomes difficult to grasp a portion with a nitrided layer formed thereon, among the surfaces of the respective rivets 9 and 9, and there is a possibility that the strength of the respective rivets 9 and 9 may not be stably improved. Therefore, in order to avoid such a disadvantage, it is conceivable that the nitriding treatment for the respective rivets 9 and 9 is performed in a state where the respective rivets 9 and 9 are aligned so as to not come into contact with each other. However, in a case of performing the nitriding treatment in this way, troublesome work for aligning the respective rivets 9 and 9, or a jig or the like for preventing the respective rivets 9 and 9 from falling down is required, and therefore, manufacturing costs increase.

On the other hand, patent document 1 discloses a manufacturing method in which in a state where an intermediate assembly 17 is configured by inserting rod portions 13a and 13a of the respective rivets 9a and 9a into the respective through-holes 12 and 12 of the cage element 8 on one side which configures a corrugated case, as shown in FIG. 10, nitriding treatment is performed on the intermediate assembly 17, and after nitriding treatment is performed on a cage element (not shown) on the other side in a state of being a single body, a pair of cage elements 8 is joined and fixed to each other by the respective rivets 9a and 9a. According to such a manufacturing method, nitriding treatment is performed on the cage element 8 on one side and the respective rivets 9a and 9a at the same time, and therefore, a dedicated nitriding process for the respective rivets 9a and 9a is not required, and thus manufacturing costs are reduced.

However, in the case of the manufacturing method of the related art described above, in a state where the intermediate assembly 17 is configured, a slight gap is present between the outer peripheral surface of each of the rod portions 13a and 13a of the rivets 9a and 9a and the inner peripheral surface of each of the through-holes 12 and 12. That is, the respective rivets 9a and 9a are not subjected to axial falling-out prevention with respect to the respective through-holes 12 and 12. For this reason, there is a possibility that the respective rivets 9a and 9a may fall out from the respective through-holes 12 and 12 during the transport of the intermediate assembly 17 or in a process after the assembling of the intermediate assembly 17.

In order to attain the axial falling-out prevention of the respective rivets 9a and 9a with respect to the respective through-holes 12 and 12 in order to avoid such a disadvantage, it is favorable if each of the rod portions 13a and 13a of the rivets 9a and 9a is press-fitted (internally fitted with an interference fit) into each of the through-holes 12 and 12. That is, in the case of the illustrated structure, each of the rod portions 13a and 13a of the rivets 9a and 9a is composed of a large-diameter portion 18 on the base end side and a small-diameter portion 19 on the tip side. For this reason, it is favorable if the large-diameter portion 18 of these is press-fitted into each of the through-holes 12 and 12 as a press-fitting portion capable of being press-fitted into each of the through-holes 12 and 12. That is, by such a press-fit, the axial falling-out prevention of the respective rivets 9a and 9a with respect to the respective through-holes 12 and 12 is attained.

However, in this case, the following problem arises. That is, usually, each of the inner peripheral surface of each of the through-holes 12 and 12 and the outer peripheral surface of each of the large-diameter portions 18 and 18 of the rivets 9a and 9a is made to be a cylindrical surface. For this reason, in a state after the above-described press-fit, the inner peripheral surface of each of the through-holes 12 and 12 and the outer peripheral surface of each of the large-diameter portions 18 and 18 are in a state of being in close contact with each other (coming into contact with each other without a gap). Therefore, when nitriding treatment is performed on the intermediate assembly 17, nitriding treatment is not performed on the respective peripheral surfaces being in close contact with each other in this manner, and thus a nitrided layer is not formed on each of these peripheral surfaces. In particular, in the case of the illustrated structure, an axial dimension $X_a$ of each of the large-diameter portions 18 and 18 is made larger than an axial dimension $Y_a$ of each of the through-holes 12 and 12 ($X_a>Y_a$), and therefore, a state is created in which the entire inner peripheral surface of each of the through-holes 12 and 12 is in close contact with the outer peripheral surface of each of the large-diameter portions 18 and 18. Therefore, a nitrided layer is not formed on the entire inner peripheral surface of each of the through-holes 12 and 12 and a nitrided layer is not formed on the outer peripheral surface of each of the large-diameter portions 18 and 18 by the same axial dimension as that of each of the through-holes 12 and 12. It is desirable that the area of a portion on which a nitrided layer is not formed in this manner is reduced as much as possible from the viewpoint of improving the durability of a corrugated cage after completion.

Further, in the case of the illustrated structure, the axial dimension $X_a$ of each of the large-diameter portions 18 and 18 is made larger than the axial dimension $Y_a$ of each of the through-holes 12 and 12 ($X_a>Y_a$). For this reason, as shown in the order of FIGS. 11A and 11B, when the rivet 9a is compressed from both sides in the axial direction between concave portions 21 and 21 of a pair of caulking dies 20 and 20 in order to form the caulking portion 15, a portion of the large-diameter portion 18 is greatly enlarged in diameter on the outside of the respective through-holes 12 and 12. Then, there is a possibility that the flange-shaped portion enlarged in diameter in this manner may protrude into a gap 22 between the inside surfaces of the respective flat plate portions 11 and 11 facing each other (a protruding portion 23 may be formed). If the protruding portion 23 is formed, as shown in FIG. 11B, even after the caulking portion 15 is formed, the gap 22 remains without disappearing, and thus the rigidity of the corrugated case after the completion is lowered, and therefore, it is not preferable.

PRIOR ART DOCUMENT

Patent Document

Patent Document 1: JP-A-10-281163

SUMMARY OF THE INVENTION

Problem to be Solved

The present invention has been invented in order to realize a method of manufacturing a corrugated cage, in which nitriding treatment can be performed at low cost, it is possible to improve the handling ability of an intermediate assembly, and furthermore, it is possible to improve durability after completion, and such a corrugated cage, in view of the circumstances as described above.

Means for Solving the Problem

The above object of the present invention is achieved by the following configurations.

(1) A method of manufacturing a corrugated cage which is provided with a pair of cage elements and a plurality of rivets, in which each of the pair of cage elements is made in the form of a corrugated ring as a whole by a metal plate which can be subjected to nitriding treatment, and has substantially partial spherical shell-shaped curved plate portions provided at a plurality of locations in a circumferential direction, flat plate portions each provided between the curved plate portions adjacent to each other in the circumferential direction, and through-holes each provided in a portion of each of the flat plate portions, each of the rivets is made of metal which can be subjected to nitriding treatment, and has a rod portion and a head portion provided at a base end portion of the rod portion, and by forming a caulking portion by crushing a tip portion of each of the rod portions in a state where the flat plate portions of the pair of cage elements are superimposed on each other and the rod portion of each of the rivets is inserted into the through-holes of the flat plate portions superimposed on each other, and joining the flat plate portions superimposed on each other by pinching the flat plate portions by the head portion of each of the rivets and the caulking portion, a portion surrounded by the curved plate portions serves as a pocket for rollably holding a ball, the method comprising:

providing a press-fitting portion, which has an axial dimension smaller than an axial dimension of each of the through-holes of the cage element on one side out of the pair of cage elements and can be press-fitted into each of the through-holes, in a base end portion of the rod portion of each of the rivets, and providing a non-press-fitting portion, which is not in contact with each of the through-holes in a state where the press-fitting portion is press-fitted into each of the through-holes, in a remaining portion of the rod portion of each of the rivets, in a state before the caulking portion is formed;

performing, in a state where an intermediate assembly made by temporarily fixing each of the rivets to the cage element on one side by press-fitting the press-fitting portion of each of the rivets into each of the through-holes of the cage element on one side is configured, nitriding treatment on the intermediate assembly;

performing nitriding treatment on the cage element on the other side out of the pair of cage elements in a state of being a single body; and thereafter, forming the caulking portion in a state where a portion protruding from each of the through-holes of the cage element on one side, of the rod portion of each of the rivets configuring the intermediate assembly, is inserted into each of the through-holes of the cage element on the other side and the flat plate portions of the pair of cage elements are superimposed on each other.

(2) The method of manufacturing a corrugated cage according to the above (1), wherein when the axial dimension of the press-fitting portion of each of the rivets is set to be X and the axial dimension of each of the through-holes of the cage element on one side is set to be Y, a relationship of X=(0.50 to 0.90)Y is established.

(3) A corrugated cage including: a pair of cage elements; and a plurality of rivets, wherein each of the pair of cage elements is made in the form of a corrugated ring as a whole by a metal plate which can be subjected to nitriding treatment, and has substantially partial spherical shell-shaped curved plate portions provided at a plurality of locations in a circumferential direction, flat plate portions each provided between the curved plate portions adjacent to each other in the circumferential direction, and through-holes each provided in a portion of each of the flat plate portions, each of the rivets is made of metal which can be subjected to nitriding treatment, and has a rod portion and a head portion provided at a base end portion of the rod portion, by forming a caulking portion by crushing a tip portion of each of the rod portions in a state where the flat plate portions of the pair of cage elements are superimposed on each other and the rod portion of each of the rivets is inserted into the through-holes of the flat plate portions superimposed on each other, and joining the flat plate portions superimposed on each other by pinching the flat plate portions by the head portion of each of the rivets and the caulking portion, a portion surrounded by the curved plate portions serves as a pocket for rollably holding a ball, in each of the rivets in a state before the caulking portion is formed, a press-fitting portion, which has an axial dimension smaller than an axial dimension of each of the through-holes of the cage element on one side out of the pair of cage elements and can be press-fitted into each of the through-holes, is provided in a base end portion of the rod portion, and a non-press-fitting portion, which is not in contact with each of the through-holes in a state where the press-fitting portion is press-fitted into each of the through-holes, is provided in a remaining portion of the rod portion, each of the rivets and the cage element on one side are subjected to nitriding treatment in a state where an intermediate assembly made by temporarily fixing each of the rivets to the cage element on one side by press-fitting the press-fitting portion of each of the rivets into each of the through-holes of the cage element on one side is configured, and the cage element on the other side out of the pair of cage elements is subjected to nitriding treatment in a state of being a single body.

(4) The corrugated cage according to the above (3), wherein when the axial dimension of the press-fitting portion of each of the rivets is set to be X and the axial dimension of each of the through-holes of the cage element on one side is set to be Y, a relationship of X=(0.50 to 0.90)Y is established.

(5) A method of manufacturing a corrugated cage which is provided with a pair of cage elements and a plurality of rivets, in which each of the pair of cage elements is made in the form of a corrugated ring as a whole by a metal plate which can be subjected to nitriding treatment, and has partial spherical curved plate portions provided at a plurality of locations in a circumferential direction, flat plate portions each provided between the curved plate portions adjacent to each other in the circumferential direction, and through-holes each provided in a portion of each of the flat plate portions, each of the rivets is made of metal which can be subjected to nitriding treatment, and has a rod portion and a head portion provided at a base end portion of the rod portion and having a larger diameter than the rod portion, by forming a caulking portion having a larger diameter than each of the rod portions by crushing a tip portion of each of the rod portions in a state where the flat plate portions of the pair of cage elements are superimposed on each other and the rod portion of each of the rivets is inserted into the through-holes of the flat plate portions superimposed on each other, and joining the flat plate portions superimposed on each other by pinching the flat plate portions by the head portion of each of the rivets and the caulking portion, a portion surrounded by the curved plate portions serves as a pocket for rollably holding a ball, and each of the through-holes of the cage element on one side out of the pair of cage elements is composed of a small-diameter hole which is provided on an outside in an axial direction and is in a dimensional relationship forming a clearance fit or a transition fit with the rod portion of the rivet, and a hole which is provided on an inside in the axial direction which is a side of the cage element on the other side, and forms a gap between itself and the rod portion of the rivet, the method comprising:

performing nitriding treatment in a state where each of the small-diameter holes of the cage element on one side and the rod portion of each of the rivets are press-fitted to each other, and performing nitriding treatment on the cage element on the other side in a state of being a single body; and thereafter, joining and fixing the pair of cage elements to each other by caulking a tip portion of the rivet in a state where a portion protruding from each of the through-holes of the cage element on one side, of the rod portion of each of the rivets, is inserted into each of the through-holes of the cage element on the other side and the flat plate portions of the pair of cage elements are superimposed on each other.

(6) A corrugated cage including: a pair of cage elements; and a plurality of rivets, wherein each of the pair of cage elements is made in the form of a corrugated ring as a whole by a metal plate which can be subjected to nitriding treatment, and has partial spherical curved plate portions provided at a plurality of locations in a circumferential direction, flat plate portions each provided between the curved plate portions adjacent to each other in the circumferential direction, and through-holes each provided in a portion of each of the flat plate portions, each of the rivets is made of metal which can be subjected to nitriding treatment, and has a rod portion and a head portion provided at a base end portion of the rod portion and having a larger diameter than the rod portion, by forming a caulking portion having a larger diameter than each of the rod portions by crushing a tip portion of each of the rod portions in a state where inside surfaces of the flat plate portions of the pair of cage elements are brought into contact with each other and the rod portion of each of the rivets is inserted into the through-holes of the flat plate portions brought into contact with each other, and joining the flat plate portions brought into contact with each other by pinching the flat plate portions by the head portion of each of the rivets and the caulking portion, a portion surrounded by the curved plate portions serves as a pocket for rollably holding a ball, each of the through-holes of the cage element on one side out of the pair of cage elements is composed of a small-diameter hole which is provided on an outside in an axial direction and is in a dimensional relationship forming a clearance fit or a transition fit with the rod portion of the rivet, and a hole which is provided on an inside in the axial direction which is a side of the cage element on the other side, and forms a gap between itself and the rod portion of the rivet, and each of the rivets and the cage element on one side are subjected to nitriding treatment in a state where each of the small-diameter holes of the cage element on one side and the rod portion of each of the rivets are press-fitted to each other, and the cage element on the other side out of the pair of cage elements is subjected to nitriding treatment in a state of being a single body.

Effects of Invention

In the case of the method of manufacturing a corrugated cage and the corrugated cage according to the present invention, nitriding treatment is performed on the intermediate assembly made by temporarily fixing each rivet to the cage element on one side, and therefore, it is possible to make the dedicated nitriding process unnecessary for each rivet. Further, in a state where the intermediate assembly is configured, each rivet is subjected to axial falling-out prevention with respect to each through-hole by press-fitting the respective press-fitting portions into the respective through-holes. For this reason, during the transport of the intermediate assembly or in a process after the assembling of the intermediate assembly, each rivet can be prevented from falling out from each through-hole. In this regard, in the case of the present invention, nitriding treatment of each member configuring the corrugated cage can be performed at a low cost and the handling ability of the intermediate assembly can be improved.

Further, the axial dimension X of the press-fitting portion of each rivet is made smaller than the axial dimension Y of each through-hole of the cage element on one side (X<Y). For this reason, in a state where the intermediate assembly is configured, the area of a portion where the inner peripheral surface of each through-hole and the outer peripheral surface of the rod portion of each rivet come into close contact with each other (come into contact with each other without a gap) can be reduced by an amount of (Y−X) in an axial dimension, as compared to a case of adopting a dimensional relationship of X≥Y. Therefore, the area of a portion on which nitriding treatment is not performed (a nitrided layer is not formed), of each of the inner peripheral surface of each through-hole and the outer peripheral surface of the rod portion of each rivet, can be reduced accordingly. As a result, the durability of the corrugated cage after the completion can be improved accordingly.

Further, the axial dimension X of the press-fitting portion of each rivet is made smaller than the axial dimension Y of each through-hole of the cage element on one side (X<Y), and therefore, in a state where the intermediate assembly is configured, the press-fitting portion of each rivet does not protrude to the outside through an inner end opening (an opening on the inside surface side of each flat plate portion) of each through-hole. For this reason, when forming the caulking portion at the tip portion of each rod portion (compressing each rivet from both sides in the axial direction) in a state where a portion protruding from each through-hole of the cage element on one side, of the rod portion of each rivet configuring the intermediate assembly, is inserted into each through-hole of the cage element on the other side, it is possible to suppress or prevent a portion of the press-fitting portion of each rivet from being enlarged in diameter on the outside of each through-hole, thereby protruding into a gap between the inside surfaces of the flat plate portions of both the cage elements facing each other. As a result, it is possible to suppress or prevent the occurrence of a disadvantage that due to such protrusion, the gap remains even after the caulking portion is formed, and thus the rigidity of the corrugated cage after the completion is lowered.

Further, each through-hole of the cage element on one side of the intermediate assembly is composed of the small-diameter hole which is provided on the outside in the axial direction and is in a dimensional relationship forming a clearance fit or a transition fit with the rod portion of the rivet, and the hole which is provided on the inside in the axial direction which is the side of the cage element on the other side, and forms a gap between itself and the rod portion of the rivet, and therefore, the area of a portion on which nitriding treatment is not performed (a nitrided layer is not formed), of each of the inner peripheral surface of each through-hole and the outer peripheral surface of the rod portion of each rivet, can be reduced to a minimum. As a result, the durability of the corrugated cage after the completion can be improved accordingly.

BRIEF DESCRIPTION OF DRAWINGS

FIG. 11A is sectional view showing, in the order of steps, work of forming a caulking portion of a rivet in the structure of a prior invention in which the rivet is press-fitted into a through-hole.

FIG. 11B is sectional view showing, in the order of steps, work of forming a caulking portion of a rivet in the structure of a prior invention in which the rivet is press-fitted into a through-hole.

DESCRIPTION OF EMBODIMENTS

[First Example of Embodiment]

Figure 1:
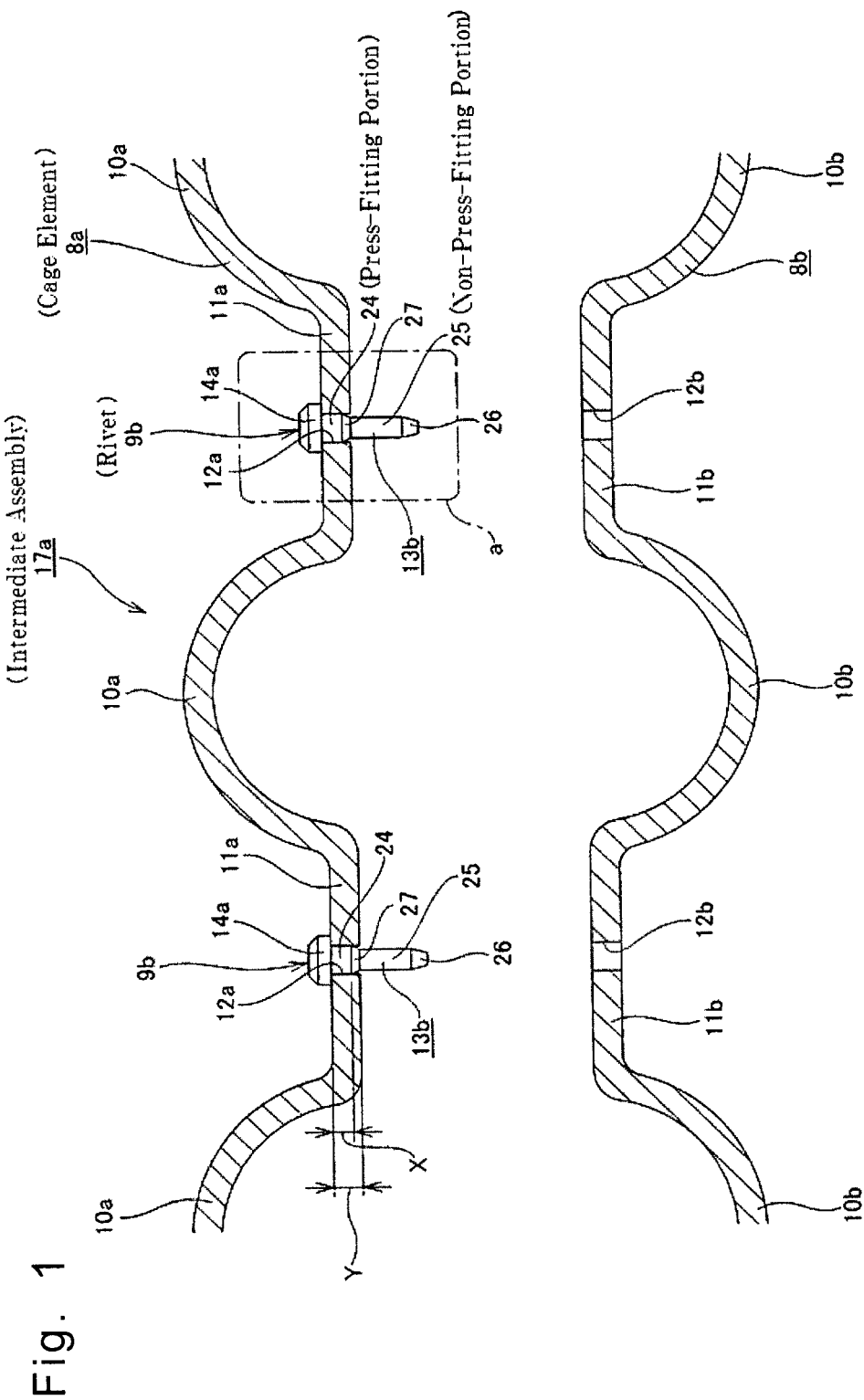
FIG. 1 is a partial cross-sectional view showing a first example of an embodiment of the present invention in a state before an intermediate assembly and a cage element on the other side are combined with each other.
Figure 2:
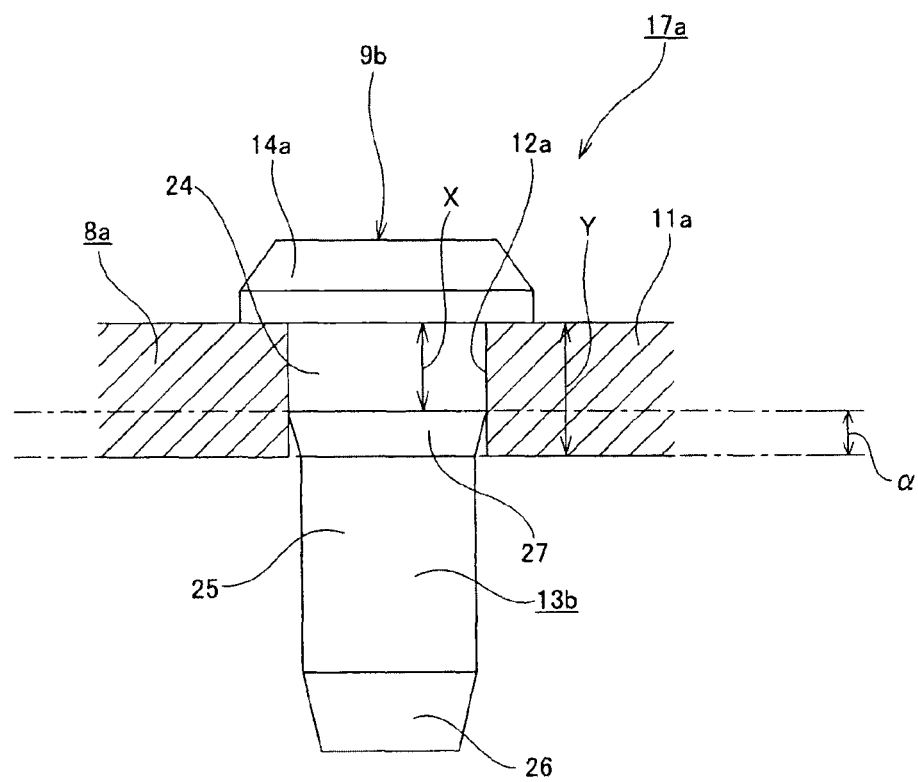
FIG. 2 is an enlarged view of portion a in FIG. 1.
Figure 3:
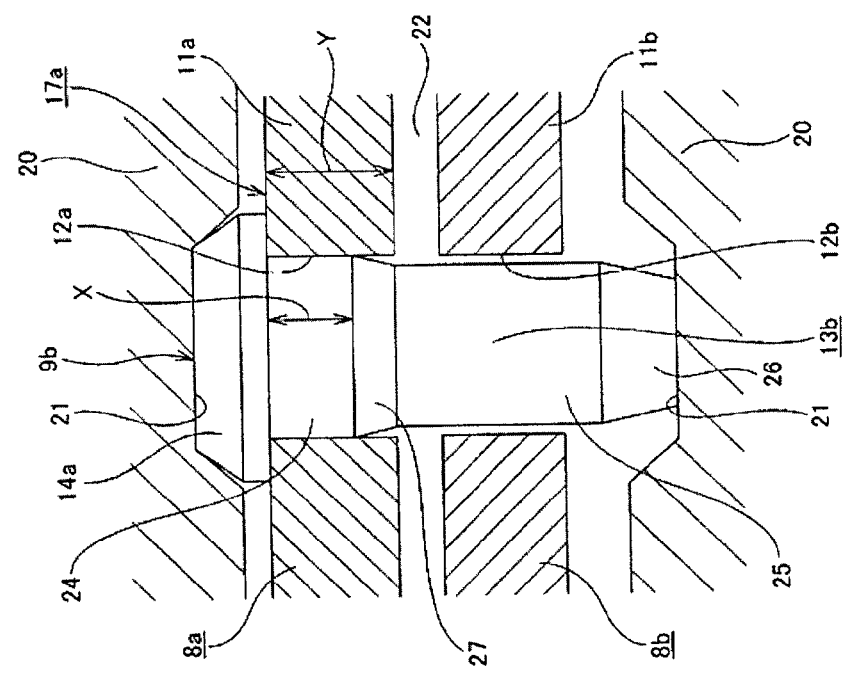
FIG. 3A is a sectional view showing work of forming a caulking portion of a rivet, in the order of processes.
FIG. 3B is a sectional view showing work of forming a caulking portion of a rivet, in the order of processes.
Figure 7:
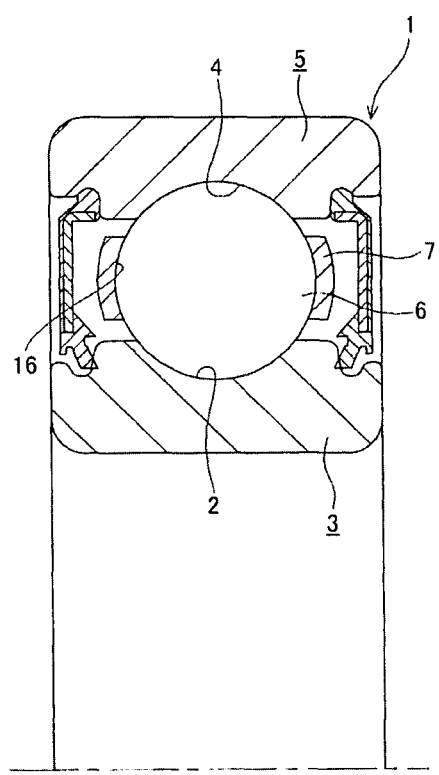
FIG. 7 is a cross-sectional view of half of a ball bearing into which a corrugated cage which is a target of the present invention is incorporated.
Figure 8:
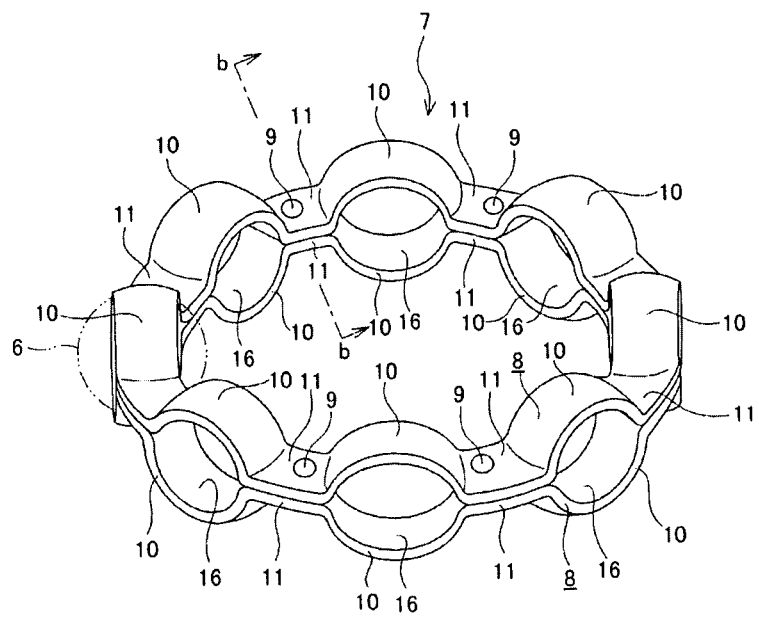
FIG. 8 is a perspective view likewise showing the corrugated cage in an extracted state.
Figure 9:
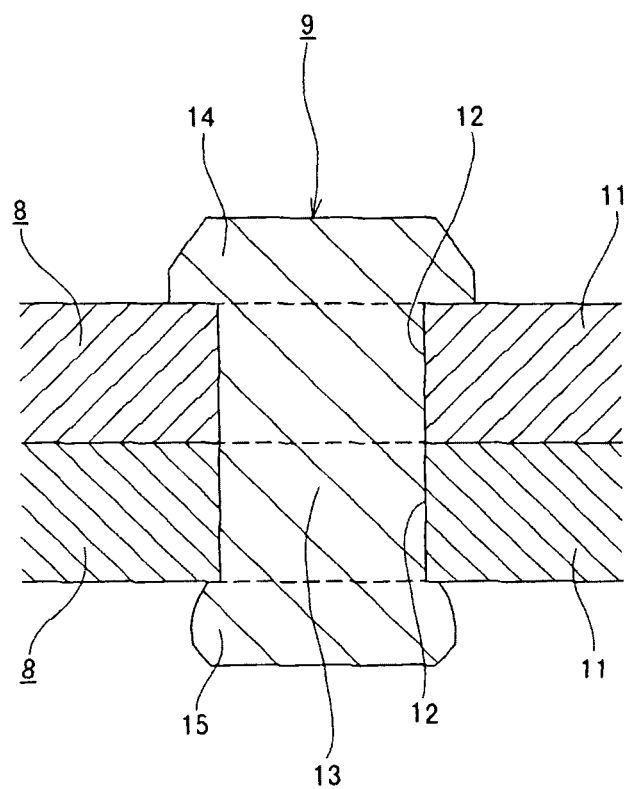
FIG. 9 is an enlarged cross-sectional view along line b-b of FIG. 8.
Figure 10:
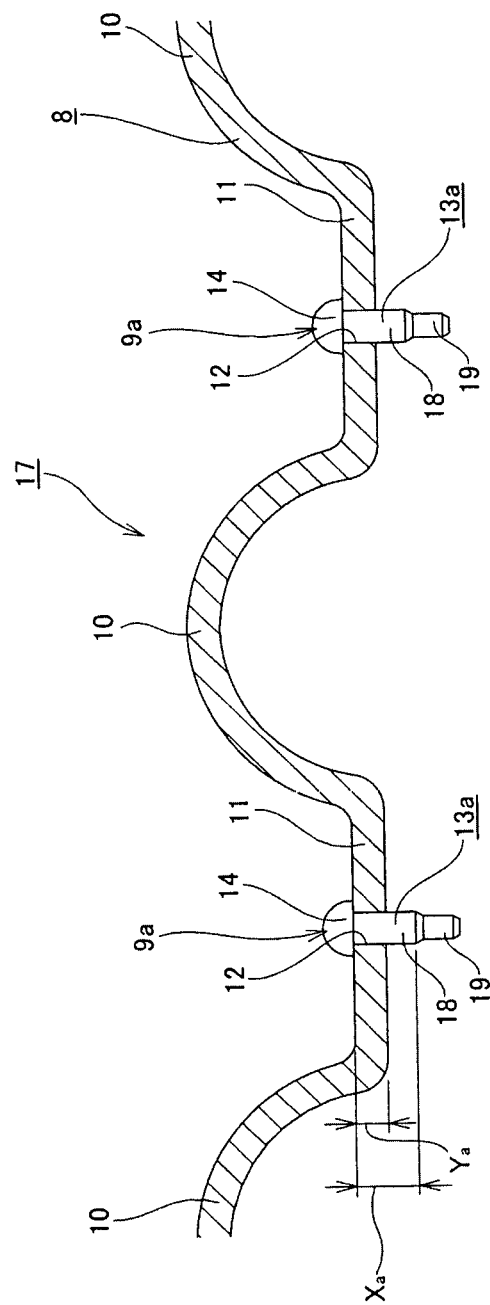
FIG. 10 is a partial cross-sectional view of an intermediate assembly which is configured by a manufacturing process of the related art.

FIGS. 1 to 3 show one example of an embodiment of the present invention. In addition, the features of this example are present in the structure of a portion in which flat plate portions 11a and 11b respectively provided in a plurality in a pair of cage elements 8a and 8b configuring a corrugated cage are combined with and fixed to each other by rivets 9b and 9b in a state where the flat plate portions 11a and 11b are superimposed on each other, and a manufacturing method thereof. The structures and the operations of other portions, including the shape and the structure of the entire corrugated cage, are the same as those in a general corrugated cage which has been known in the past, including the structure shown in FIGS. 7 to 9 described above, and therefore, overlapping illustration and description are omitted or simplified, and hereinafter, description will be made focusing on the characterizing portion of this example.

In addition, a general corrugated cage which is a target of this example refers to a corrugated cage in which, in a completed state, opening widths of both ends of each pocket is made smaller than the diameter of a ball to be held in each pocket, as described above.

In the case of this example, the pair of cage elements 8a and 8b is made of a metal plate which can be subjected to nitriding treatment, such as a steel sheet or a stainless steel sheet, and has the same shape and size each other. Each of through-holes 12a and 12b respectively provided in the flat plate portions 11a and 11b among a plurality of curved plate portions 10a and 10b and a plurality of the flat plate portions 11a and 11b configuring the pair of cage elements 8a and 8b is a simple circular hole. That is, the inner peripheral surface of each of the through-holes 12a and 12b is made to be a simple cylindrical surface.

Further, each of the rivets 9b and 9b is made of metal which can be subjected to nitriding treatment, such as steel or stainless steel. In a state before a caulking portion 15a (described later) {refer to FIG. 3B} is formed, each of rod portions 13b and 13b of the rivets 9b and 9b is composed of a columnar press-fitting portion 24 configuring a base end portion and a substantially columnar non-press-fitting portion 25 configuring a tip portion and an intermediate portion and having a smaller diameter than the press-fitting portion 24, which are disposed concentrically with each other, as shown in FIGS. 1, 2, and 3A. The press-fitting portion 24 can be press-fitted into each of the through-holes 12a and 12a of the cage element 8a on one side of the pair of cage elements 8a and 8b. An axial dimension X of the press-fitting portion 24 is made smaller than an axial dimension Y of each of the through-holes 12a and 12a (X<Y). Further, the outer peripheral surface of the non-press-fitting portion 25 has a simple cylindrical surface at an intermediate portion in an axial direction. A tip portion and a base end portion of the non-press-fitting portion 25 respectively have partial conical guide faces 26 and 27 inclined in a direction in which a diameter becomes smaller as it goes toward the tip side. Each of the guide faces 26 and 27 facilitate insertion of the rod portion 13b into each of the through-holes 12a and 12a.

In a case of manufacturing the corrugated cage of this example, first, the pair of cage elements 8a and 8b and the respective rivets 9b and 9b having the configurations as described above are obtained. Thereafter, as shown in FIGS. 1 and 2, the press-fitting portions 24 and 24 of the respective rivets 9b and 9b are press-fitted into the respective through-holes 12a and 12a of the cage element 8a on one side and the inside surfaces of head portions 14a and 14a of the respective rivets 9b and 9b are brought into contact with the outside surfaces (the upper surfaces in FIGS. 1 to 3) of the respective flat plate portions 11a and 11a of the cage element 8a on one side. In this way, an intermediate assembly 17a which is formed by temporarily fixing the respective rivets 9b and 9b to the cage element 8a on one side is configured. In addition, in a state where the intermediate assembly 17a is configured, the outer peripheral surfaces of the non-press-fitting portions 25 and 25 of the respective rivets 9b and 9b are not in contact with the inner peripheral surfaces of the respective through-holes 12a and 12a. Then, in this state, nitriding treatment is performed on the intermediate assembly 17a. In this way, nitrided layers are formed on portions in which the respective rivets 9b and 9b and the cage element 8a on one side are not in contact with each other, of the surfaces of the respective rivets 9b and 9b and the cage element 8a on one side. Along with this, nitriding treatment is performed on the cage element 8b on the other side out of the pair of cage elements 8a and 8b in a state of being a single body. In this way, a nitrided layer is formed on the entire surface of the cage element 8b on the other side. In addition, the specific type and method of the nitriding treatment described above can adopt various types and methods that have been known in the past, such as those disclosed in Patent Document 1, for example.

Thereafter, as shown in FIG. 3A, a portion protruding from each through-hole 12a of the cage element 8a on one side, of the rod portion 13b of each rivet 9b configuring the intermediate assembly 17a, is inserted into each through-hole 12b of the cage element 8b on the other side. Along with this, one ball 6 (refer to FIG. 7, not shown in FIGS. 1 to 3) is sandwiched between the inner surfaces of the respective curved plate portions 10a and 10b (refer to FIG. 1) of the pair of cage elements 8a and 8b. Then, in this state, as shown in the order of FIGS. 3A and 3B, the caulking portion 15a is formed by crushing the tip portion of the rod portion 13b of each rivet 9b by compressing each rivet 9b from both sides in the axial direction between the bottom surfaces of concave portions 21 and 21 of a pair of caulking dies 20 and 20. Then, a corrugated cage is completed by joining the respective flat plate portions 11a and 11b of both the cage elements 8a and 8b superimposed on each other, to each other by pinching the flat plate portions 11a and 11b by the head portion 14a and the caulking portion 15a of each rivet 9b.

In the case of the method of manufacturing the corrugated cage of this example as described above and the corrugated cage, nitriding treatment is performed on the intermediate assembly 17a formed by temporarily fixing the respective rivets 9b and 9b to the cage element 8a on one side, and therefore, it is possible to make a dedicated nitriding process unnecessary for the respective rivets 9b and 9b. Further, in a state where the intermediate assembly 17a is configured, the respective rivets 9b and 9b are subjected to axial falling-out prevention with respect to the respective through-holes 12a and 12a by press-fitting the respective press-fitting portions 24 and 24 into the respective through-holes 12a and 12a. For this reason, during the transport of the intermediate assembly 17a or in a process after the assembling of the intermediate assembly 17a, the respective rivets 9b and 9b can be prevented from falling out from the respective through-holes 12a and 12a. In this regard, in the case of this example, nitriding treatment of each member configuring the corrugated cage can be performed at low cost and the handling ability of the intermediate assembly 17a can be improved.

Further, in the case of this example, the axial dimension X of each of the press-fitting portions 24 and 24 of the rivets 9b and 9b is made smaller than the axial dimension Y of each of the through-holes 12a and 12a of the cage element 8a on one side (X<Y). For this reason, in a state where the intermediate assembly 17a is configured, portions (portions which are present in a range a of FIG. 2) deviated from each of the press-fitting portions 24 and 24 in the axial direction, of the inner peripheral surface of each of the through-holes 12a and 12a and the outer peripheral surface of each of the rod portions 13b and 13b of the rivets 9b and 9b which face each other, can be made to be portions which do not come into close contact with each other. Therefore, nitriding treatment can be performed on these portions which do not come into close contact with each other (nitrided layers can be formed on the portions and cured), and thus the durability of the corrugated cage after the completion can be improved accordingly.

Further, in the case of this example, the axial dimension X of each of the press-fitting portions 24 and 24 of the rivets 9b and 9b is made smaller than the axial dimension Y of each of the through-holes 12a and 12a of the cage element 8a on one side (X<Y), and therefore, in a state where the intermediate assembly 17a is configured, each of the press-fitting portions 24 and 24 does not protrude to the outside through an inner end opening {an opening on the side of the inside surface (the lower surface in FIGS. 1 to 3) of each of the flat plate portions 11a and 11a} of each of the through-holes 12a and 12a. For this reason, as shown in the order of FIGS. 3A and 3B described above, when compressing each rivet 9b from both sides in the axial direction in order to form the caulking portion 15a, it is possible to suppress or prevent a portion of the press-fitting portion 24 of each rivet 9b from being enlarged in diameter at the outside of each through-hole 12a, thereby protruding into a gap 22 between the inside surfaces of the respective flat plate portions 11a and 11b facing each other. As a result, it is possible to suppress or prevent the occurrence of a disadvantage that due to such protrusion, the gap 22 remains even after the caulking portion 15a is formed, and thus the rigidity of the corrugated cage after the completion is lowered.

In addition, in a case of carrying out this example, it is preferable that the above-described dimensional relationship, X<Y, is regulated to a range of X=(0.50 to 0.90)Y. In this regard, the reason why it is preferable that the dimensional relationship is regulated to a range of X≤0.90Y is for reducing the area of a portion on which nitriding treatment is not performed (a nitrided layer is not formed), out of the outer peripheral surface of each of the rod portions 13b and 13b of the rivets 9b and 9b and the inner peripheral surface of each of the through-holes 12a and 12a, as much as possible, and furthermore, for reliably preventing the formation of the protruding portion 23 as shown in FIG. 11B when forming the caulking portion 15a. On the other hand, the reason why it is preferable that the dimensional relationship is regulated to a range of X≥0.50Y is for making it easy to sufficiently secure the falling-out force of each of the rivets 9b and 9b with respect to each of the through-holes 12a and 12a by securing a fitting length between each of the through-holes 12a and 12a and each of the rod portions 13b and 13b. In any case, in a case of carrying out the present invention, design is performed such that the above-described dimensional relationship {X<Y, X=(0.50 to 0.90)Y} is reliably established, in consideration of the tolerance or the like of each member configuring the corrugated cage.

Further, in the embodiment described above, in a state where the intermediate assembly 17a is configured, the inside surface of each of the head portions 14a and 14a of the rivets 9b and 9b is brought into contact with the outside surface of each of the flat plate portions 11a and 11a of the cage element 8a on one side. For this reason, there is a possibility that nitrided layers may not be formed on even the respective side surfaces brought into contact with each other in this manner.

In contrast, in a case of carrying out the present invention, when performing nitriding treatment on the intermediate assembly 17a, if a gap is provided between the inside surface of each of the head portions 14a and 14a and the outside surface of each of the flat plate portions 11a and 11a, a nitrided layer can also be reliably formed on a portion of each of the inside surface of each of the head portions 14a and 14a and the outside surface of each of the flat plate portions 11a and 11a, which face each other. In this case, after the nitriding treatment is performed, work of bringing the inside surface of each of the head portions 14a and 14a and the outside surface of each of the flat plate portions 11a and 11a into contact with each other is performed. In addition, if this work is performed simultaneously with the formation of the caulking portion 15a, the number of manufacturing processes does not increase.

[Second Example of Embodiment]

Figure 4:
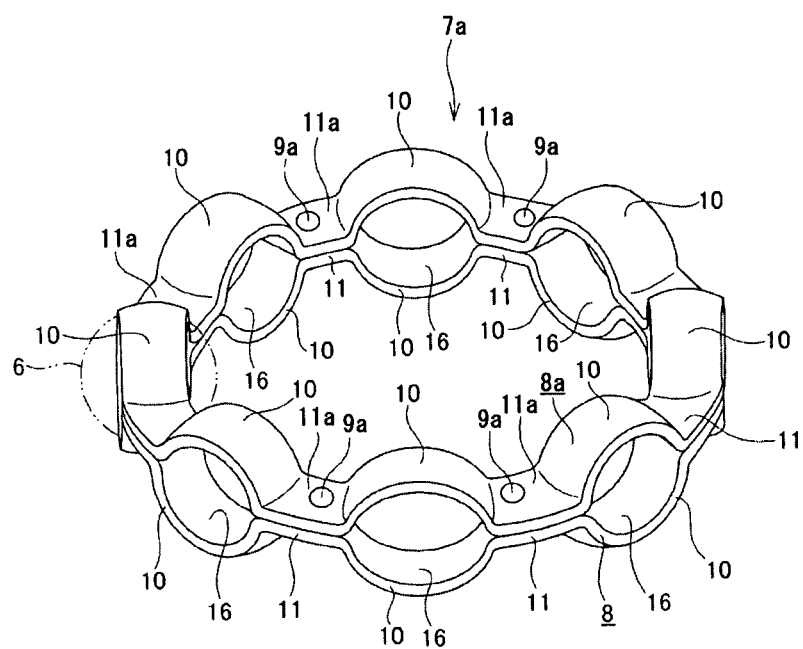
FIG. 4 is a perspective view showing a corrugated cage which is a second example of the embodiment of the present invention.
Figure 5:
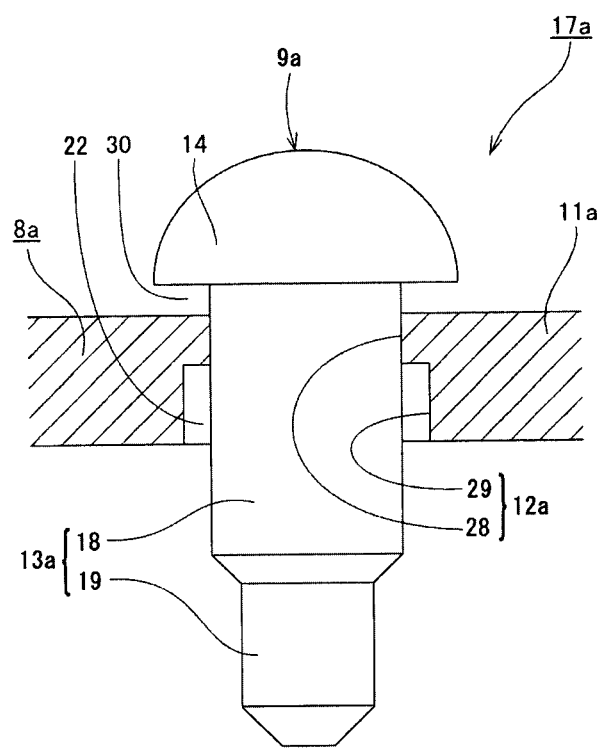
FIG. 5 is a partial sectional view of an intermediate assembly of the corrugated cage which is the second example of the embodiment of the present invention.

FIG. 4 shows a perspective view of a corrugated cage of a second example of the embodiment of the present invention, and FIG. 5 shows a partial sectional view of an intermediate assembly of the corrugated cage. In addition, the feature of this example is that the shape of each through-hole 12a of the cage element 8a on one side out of the pair of cage elements 8 and 8a configuring a cage is devised. A manufacturing method and a structure other than this characterizing portion are substantially the same as the manufacturing method and the structure of the corrugated cage of the prior invention described above, or a manufacturing method and a structure of a corrugated cage which has been known in the past, and therefore, with respect to portions which are configured similarly to the prior invention or the conventional structure, the description thereof is simplified, and hereinafter, description will be made focusing on the characterizing portion of this example.

In addition, a general corrugated cage which is a target of this example refers to a corrugated cage in which in a completed state, opening widths of both ends of each pocket is made smaller than the diameter of a ball to be held in each pocket, as described above.

A corrugated cage 7a of the this example is composed of a pair of cage elements 8 and 8a, and a plurality of rivets 9a and 9a for joining the pair of cage elements 8 and 8a to each other, similar to the corrugated cage 7 of the structure of the related art shown in FIGS. 7 to 10. Each of the rivets 9a and 9a of these is the same as the rivet 9a of the structure of the related art, is made of metal which can be subjected to nitriding treatment, such as steel or stainless steel, and is provided with a rod portion 13a and a head portion 14 provided at a base end portion of the rod portion 13a. Each of the rod portions 13a and 13a is composed of a large-diameter portion 18 on the base end side and a small-diameter portion 19 on the tip side.

Each of the pair of cage elements 8 and 8a is made in the form of a corrugated ring as a whole by performing punching and bending by a press on a material made of a metal plate which can be subjected to nitriding treatment, such as a steel sheet or a stainless steel sheet. The cage element 8a on one side has partial spherical curved plate portions 10 and 10 provided at a plurality of locations in a circumferential direction, flat plate portions 11a and 11a each provided between the curved plate portions 10 and 10 adjacent to each other in the circumferential direction, and through-hole 12a provided in the central portion in the circumferential direction of each of the flat plate portions 11a and 11a, similar to the cage element 8 of the structure of the related art. The cage element 8 on the other side is the same as the cage element 8 of the structure of the related art and has the partial spherical curved plate portions 10 and 10 provided at a plurality of locations in the circumferential direction, flat plate portions 11 and 11 each provided between the curved plate portions 10 and 10 adjacent to each other in the circumferential direction, and a through-hole 12 provided in a central portion in the circumferential direction of each of the flat plate portions 11 and 11.

Each through-hole 12a formed in each flat plate portion 11a of the cage element 8a on one side out of the pair of cage elements 8 and 8a is formed as a two-stage hole composed of a small-diameter hole 28 on the outside in the axial direction (the side opposite to the cage element 8 on the other side), and a large-diameter hole 29 on the inside in the axial direction (the side on the cage element 8 on the other side) having a large diameter, as shown in FIG. 5. An inner diameter dimension $d_{28}$ of the small-diameter hole 28 and an outer diameter dimension $D_{18}$ of the columnar large-diameter portion 18 provided in a portion close to the head portion 14 of the rod portion 13a of the rivet 9a have a dimensional relationship forming a clearance fit or a transition fit to the extent that falling-out does not occur when the two are press-fitted to each other. On the other hand, an inner diameter dimension $d_{29}$ of the large-diameter hole 29 is larger than the outer diameter dimension $D_{18}$ of the large-diameter hole 18 ($d_{29} > D_{18}$), and thus a press-fit dimensional relationship is not provided therebetween.

Therefore, in a state where the large-diameter portion 18 of the rivet 9a is press-fitted into the small-diameter hole 28, a gap 22 is formed between the large-diameter hole 29 and the outer peripheral surface of the large-diameter portion 18 of the rivet 9a.

Further, the through-hole 12a can be shaped by press punching and can be shaped by the same process as a conventional working process.

Next, a method of manufacturing the corrugated cage of this example having the configuration as described above will be described.

First, similar to the prior invention described above, an intermediate assembly 17a shown in FIG. 5 is assembled. Specifically, the head portion 14 of the rivet 9a is disposed on the outside in the axial direction (the side opposite to the cage element 8 on the other side) of the cage element 8a on one side out of the pair of cage elements 8 and 8a and the large-diameter portion 18 is press-fitted into the small-diameter hole 28 of each through-hole 12a. However, at this time, the head portion 14 of the rivet 9a is press-fitted in a state of slightly floating without coming into close contact with the flat plate portion 11a. In this state, the gap 22 is formed between the large-diameter hole 29 of the through-hole 12a and the outer peripheral surface of the large-diameter portion 18 of the rivet 9a, and a gap 30 is formed between the head portion 14 of the rivet 9a and the flat plate portion 11a. Subsequently, nitriding treatment is performed on the intermediate assembly 17a configured as described above. On the other hand, nitriding treatment is performed on the cage element 8 on the other side out of both the cage elements 8 and 8a in a state of being a single body.

In the case of this example, in the cage element 8 on the other side, a nitrided layer is formed on the entire peripheral surface thereof. On the other hand, in the intermediate assembly 17a, the small-diameter hole 28 of the through-hole 12a and the large-diameter portion 18 of the rivet 9a are press-fitted to each other, and therefore, a nitrided layer is not formed on the press-fitted portion. However, since the gap 30 is formed between the head portion 14 of the rivet 9a and the flat plate portion 11a and the gap 22 is formed between the large-diameter hole 29 of the through-hole 12a and the outer peripheral surface of the large-diameter portion 18 of the rivet 9a, nitrided layers are formed on the portions.

Subsequently, in a state where the flat plate portion 11a of the intermediate assembly 17a and the flat plate portion 11 of the cage element 8 on the other side are superimposed on each other while the rod portion 13a of the rivet protruding from the through-hole 12a of the intermediate assembly 17a is inserted into the through-hole 12 of the cage element 8 on the other side, each ball 6 is sandwiched between the inner surfaces of the curved plate portions 10 and 10 of the pair of cage elements 8 and 8a. Then, in this state, the pair of cage elements 8 and 8a are combined with and fixed to each other by caulking the tip portion of the rivet 9a while bringing the head portion 14 of the rivet 9a into close contact with the flat plate portion 11a of the cage element 8a. Further, at the time of such caulking work, the rod portion 13a of the rivet 9a receives a pressing force in the axial direction, thereby being plastically deformed so as to expand radially outward on the inside of the through-holes 12 and 12a of the pair of cage elements 8 and 8a. The rivet 9a is plastically deformed in this manner, whereby a portion or the entirety of a gap which is present between the outer peripheral surface of each rivet 9 and the inner peripheral surface of each of the through-holes 12 and 12a, including the gap 22, is eliminated. As a result, both the cage elements 8 and 8a and the rod portion 13 of each rivet 9a are fixed to each other without rattling.

In addition, in the above-described manufacturing method, the intermediate assembly 17a has the gap 30 formed between the head portion 14 of the rivet 9a and the flat plate portion 11a. However, for example, in a case where it is difficult to eliminate the gap 30 in a caulking process or the like, or a case where costs are incurred, the gap 30 may not necessarily be provided.

According to this example as described above, even in a case where nitriding treatment is performed in a state where each rivet 9a is assembled to the cage element 8a on one side (the state of the intermediate assembly 17a), a nitrided layer is formed on a portion of each of the inner peripheral surface of each through-hole 12a of the cage element 8a on one side and the outer peripheral surface of the large-diameter portion 18 of each rivet 9, and thus a structure having excellent durability can be realized.

In addition, each of the opening widths of both ends of each pocket 16 configuring the general corrugated cage 7 is made smaller than the diameter of the ball 6 to be held in each pocket 16. For this reason, in the case of the general corrugated cage 7, it is not possible to incorporate each ball 6 into each pocket 16 in a state after the completion. Therefore, in a case where the manufacturing method according to the present invention described above is carried out with such a general corrugated cage as a target, as described above, it is necessary to sandwich the respective balls 6 and 6 between the inner surfaces of the curved plate portions 10 and 10 of the pair of cage elements 8 and 8a before the tip portion of the rivet 9a is caulked.

In contrast, although it is a special example, in a case where the manufacturing method according to the present invention described above is carried out with a corrugated cage in which in a state after completion, only the opening width on one side out of the opening widths of both ends of each pocket is made smaller than the diameter of a ball to be held in each pocket and the opening width on the other side is made larger than the diameter of each ball, as a target, each ball does not necessarily need to be sandwiched between the inner surfaces of curved plate portions of a pair of cage elements before a caulking portion is formed.

[Third Example of Embodiment]

Figure 6:
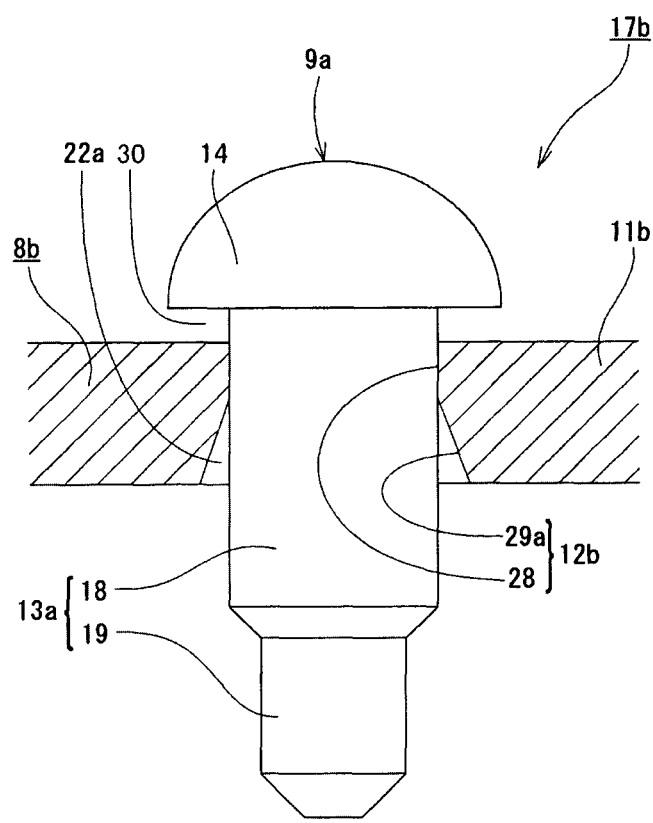
FIG. 6 is a partial sectional view of an intermediate assembly of a corrugated cage which is a third example of the embodiment of the present invention.

FIG. 6 shows a partial sectional view of an intermediate assembly 17b of a corrugated cage which is a third example of the embodiment of the present invention. A cage element 8b on one side of this embodiment is different only in the shape of a through-hole 12b formed in a flat plate portion 11b from the cage element 8a on one side of the second example of the embodiment. Configurations other than this are the same as those in the second example of the embodiment, and therefore, the description thereof is omitted.

Each through-hole 12b formed in each flat plate portion 11b of the cage element 8b on one side is composed of the small-diameter hole 28 on the outside in the axial direction (the side opposite to the cage element 8 on the other side), and a tapered hole 29a on the inside in the axial direction (the side of the cage element 8 on the other side), as shown in FIG. 6. The inner diameter dimension $d_{28}$ of the small-diameter hole 28 and the outer diameter dimension $D_{18}$ of the columnar large-diameter hole 18 provided in a portion close to the head portion 14 of the rod portion 13a of the rivet 9a are in a dimensional relationship forming a clearance fit or a transition fit. On the other hand, the tapered hole 29a is a hole having a tapered shape in which a diameter gradually increases as it goes toward the inside in the axial direction (the side of the cage element 8 on the other side) from the small-diameter hole 28.

Therefore, in a state where the large-diameter portion 18 of the rivet 9a is press-fitted into the small-diameter hole 28, a gap 22a is formed between the tapered hole 29a and the outer peripheral surface of the large-diameter portion 18 of the rivet 9a.

By adopting such a configuration, it is possible to obtain the same effect as that in the corrugated cage 7a of the second example of the embodiment.

In addition, in the second example and the third example of the embodiment of the present invention described above, an example of a combination of the cage element 8a or 8b on one side and the cage element 8 on the other side has been described. However, even in a combination of the two cage elements 8a or a combination of the two cage elements 8b, it is possible to obtain the same effect. Further, the shape of rivet 9a is also not limited to the shape of the above description and illustration.

Further, this application is based on Japanese Patent Application No. 2013-134424 filed on Jun. 27, 2013, Japanese Patent Application No. 2013-206215 filed on Oct. 1, 2013, and Japanese Patent Application No. 2013-271393 filed on Dec. 27, 2013, the contents of which are incorporated herein by reference.

INDUSTRIAL APPLICABILITY

As described above, in the method of manufacturing a corrugated cage and the corrugated cage according to the present invention, nitriding treatment of each member configuring the corrugated cage can be performed at a low cost and the handling ability of the intermediate assembly can be improved. Further, the area of a portion on which nitriding treatment is not performed (a nitrided layer is not formed) can be reduced to a minimum, and therefore, the durability of the corrugated cage after completion can be improved.

Therefore, it is possible to suitably adopt the present invention as a corrugated cage which holds balls, which configures various rolling bearings which are incorporated into rotary support portions of various machinery and equipment such as automobiles, general industrial machinery, or machine tools, such as a radial ball bearing, for example, and a method of manufacturing the corrugated cage.

Further, the method of manufacturing a corrugated cage and the corrugated cage according to the present invention are not limited to the general corrugated cage described above and can also be carried out with a special corrugated cage in which only the opening width on one side out of the opening widths of both ends of each pocket is made smaller than the diameter of a ball to be held in each pocket and the opening width on the other side is made larger than the diameter of each ball, as a target.

DESCRIPTION OF REFERENCE NUMERALS

1: ball bearing
2: inner ring raceway
3: inner ring
4: outer ring raceway
5: outer ring
6: ball
7, 7a: cage
8. 8a, 8b: cage element
9, 9a, 9b: rivet
10, 10a, 10b: curved plate portion
11, 11a, 11b: flat plate portion
12, 12a, 12b: through-hole
13, 13a, 13b: rod portion
14, 14a: head portion
15, 15a: caulking portion
16: pocket
17, 17a: intermediate assembly
18: large-diameter portion
19: small-diameter portion
20: caulking die
21: concave portion
22: gap
23: protruding portion
24: press-fitting portion
25: non-press-fitting portion
26: guide face
27: guide face
28: small-diameter hole
29: large-diameter hole
29a: tapered hole
30: gap

The invention claimed is:

1. A method of manufacturing a corrugated cage which is provided with a pair of cage elements and a plurality of rivets, in which each of the pair of cage elements is made in the form of a corrugated ring as a whole by a metal plate which can be subjected to nitriding treatment, and has partial spherical curved plate portions provided at a plurality of locations in a circumferential direction, flat plate portions each provided between the curved plate portions adjacent to each other in the circumferential direction, and through-holes each provided in a portion of each of the flat plate portions, each of the rivets is made of metal which can be subjected to nitriding treatment, and has a rod portion and a head portion provided at a base end portion of the rod portion and having a larger diameter than the rod portion, by forming a caulking portion having a larger diameter than each of the rod portions by crushing a tip portion of each of the rod portions in a state where the flat plate portions of the pair of cage elements are superimposed on each other and the rod portion of each of the rivets is inserted into the through-holes of the flat plate portions superimposed on each other, and joining the flat plate portions superimposed on each other by pinching the flat plate portions by the head portion of each of the rivets and the caulking portion, a portion surrounded by the curved plate portions serves as a pocket for rollably holding a ball, and each of the through-holes of the cage element on one side out of the pair of cage elements is composed of a small-diameter hole which is provided on an outside in an axial direction and is in a dimensional relationship forming a clearance fit or a transition fit with the rod portion of the rivet, and a hole which is provided on an inside in the axial direction which is a side of the cage element on the other side, and forms a gap between itself and the rod portion of the rivet, the method comprising:

performing nitriding treatment in a state where each of the small-diameter holes of the cage element on one side and the rod portion of each of the rivets are press-fitted to each other, and performing nitriding treatment on the cage element on the other side in a state of being a single body; and thereafter, joining and fixing the pair of cage elements to each other by caulking a tip portion of the rivet in a state where a portion protruding from each of the through-holes of the cage element on one side, of the rod portion of each of the rivets, is inserted into each of the through-holes of the cage element on the other side and the flat plate portions of the pair of cage elements are superimposed on each other.

2. A corrugated cage comprising:

a pair of cage elements; and a plurality of rivets, wherein each of the pair of cage elements is made in the form of a corrugated ring as a whole by a metal plate which can be subjected to nitriding treatment, and has partial spherical curved plate portions provided at a plurality of locations in a circumferential direction, flat plate portions each provided between the curved plate portions adjacent to each other in the circumferential direction, and through-holes each provided in a portion of each of the flat plate portions, each of the rivets is made of metal which can be subjected to nitriding treatment, and has a rod portion and a head portion provided at a base end portion of the rod portion and having a larger diameter than the rod portion, by forming a caulking portion having a larger diameter than each of the rod portions by crushing a tip portion of each of the rod portions in a state where inside surfaces of the flat plate portions of the pair of cage elements are brought into contact with each other and the rod portion of each of the rivets is inserted into the through-holes of the flat plate portions brought into contact with each other, and joining the flat plate portions brought into contact with each other by pinching the flat plate portions by the head portion of each of the rivets and the caulking portion, a portion surrounded by the curved plate portions serves as a pocket for rollably holding a ball, each of the through-holes of the cage element on one side out of the pair of cage elements is composed of a small-diameter hole which is provided on an outside in an axial direction and is in a dimensional relationship forming a clearance fit or a transition fit with the rod portion of the rivet, and a hole which is provided on an inside in the axial direction which is a side of the cage element on the other side, and forms a gap between itself and the rod portion of the rivet, and each of the rivets and the cage element on one side are subjected to nitriding treatment in a state where each of the small-diameter holes of the cage element on one side and the rod portion of each of the rivets are press-fitted to each other, and the cage element on the other side out of the pair of cage elements is subjected to nitriding treatment in a state of being a single body.

* * * * *